United States Patent
Flacher et al.

(10) Patent No.: US 10,063,578 B2
(45) Date of Patent: Aug. 28, 2018

(54) NETWORK-CENTRIC VISUALIZATION OF NORMAL AND ANOMALOUS TRAFFIC PATTERNS

(71) Applicant: Cisco Technology, Inc., San Jose, CA (US)

(72) Inventors: Fabien Flacher, Antony (FR); Jean-Philippe Vasseur, Anchorage, AK (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/092,993

(22) Filed: Apr. 7, 2016

(65) Prior Publication Data
US 2016/0352766 A1 Dec. 1, 2016

Related U.S. Application Data

(60) Provisional application No. 62/167,610, filed on May 28, 2015.

(51) Int. Cl.
*H04L 29/06* (2006.01)
*H04L 12/28* (2006.01)
*H04L 29/08* (2006.01)

(52) U.S. Cl.
CPC .......... *H04L 63/1425* (2013.01); *H04L 12/28* (2013.01); *H04L 63/1416* (2013.01); *H04L 67/02* (2013.01); *H04L 67/10* (2013.01)

(58) Field of Classification Search
CPC .................. H04L 63/1425; H04L 63/1416
See application file for complete search history.

(56) References Cited

U.S. PATENT DOCUMENTS

| 8,185,955 | B2 | 5/2012 | Cangini et al. |
| 8,544,087 | B1 | 9/2013 | Eskin et al. |
| 8,762,515 | B2 * | 6/2014 | Knapp ............... H04L 12/18 709/223 |
| 8,813,220 | B2 * | 8/2014 | Knapp ............... H04L 63/1425 726/22 |
| 9,015,536 | B1 * | 4/2015 | Ricken ............... G06F 11/0709 714/47.2 |

(Continued)

OTHER PUBLICATIONS

Sajassi, et al., "BGP MPLS Based Ethernet VPN", Network Working Group Internet Draft, draft-ietf-l2vpn-evpn-11, Oct. 2014, 52 pages, The Internet Engineering Task Force Trust.

(Continued)

*Primary Examiner* — Ali Shayanfar
(74) *Attorney, Agent, or Firm* — Parker Ibrahim & Berg LLP; James M. Behmke; Stephen D. LeBarron

(57) ABSTRACT

In one embodiment, a device in a network analyzes local network data regarding a portion of the network that is local to the device using a first anomaly detection model. The device analyzes the local network data using a second anomaly detection model that was trained in part using remote network data regarding a portion of the network that is remote to the device. The device compares outputs of the first and second anomaly detection models. The device identifies the local network data as peculiar, in response to the first anomaly detection model determining the local network data to be normal and the second anomaly detection model determining the local network data to be anomalous.

18 Claims, 11 Drawing Sheets

(56) References Cited

U.S. PATENT DOCUMENTS

| | | | |
|---|---|---|---|
| 9,166,997 B1* | 10/2015 | Guo | H04L 63/1433 |
| 9,397,906 B2* | 7/2016 | Srivastava | H04L 43/065 |
| 9,497,204 B2* | 11/2016 | Symons | G06N 5/043 |
| 2005/0018618 A1* | 1/2005 | Mualem | H04L 63/1458 |
| | | | 370/252 |
| 2006/0143709 A1 | 6/2006 | Brooks et al. | |
| 2007/0121596 A1* | 5/2007 | Kurapati | H04L 29/06027 |
| | | | 370/356 |
| 2008/0262985 A1* | 10/2008 | Cretu | G06N 99/005 |
| | | | 706/12 |
| 2010/0046393 A1* | 2/2010 | Knapp | H04L 41/0609 |
| | | | 370/253 |
| 2010/0050262 A1* | 2/2010 | Knapp | H04L 63/1466 |
| | | | 726/25 |
| 2010/0153316 A1* | 6/2010 | Duffield | G06F 21/552 |
| | | | 706/12 |
| 2013/0305357 A1* | 11/2013 | Ayyagari | H04W 12/06 |
| | | | 726/22 |
| 2015/0106306 A1* | 4/2015 | Birdwell | G06N 3/02 |
| | | | 706/11 |
| 2015/0161394 A1* | 6/2015 | Ferragut | G06F 21/577 |
| | | | 726/25 |
| 2015/0193696 A1 | 7/2015 | Vasseur et al. | |
| 2015/0304349 A1* | 10/2015 | Bernstein | H04L 63/1425 |
| | | | 726/22 |
| 2015/0341376 A1* | 11/2015 | Nandy | H04L 63/1408 |
| | | | 726/23 |
| 2016/0342903 A1* | 11/2016 | Shumpert | G06N 99/005 |

OTHER PUBLICATIONS

Wagstaff, et al., "Guiding Scientific Discovery with Explanations Using DEMUD", Proceedings of the 27th AAAI Conference on Artificial Intelligence, pp. 905-911, Jun. 2013, North America.

* cited by examiner

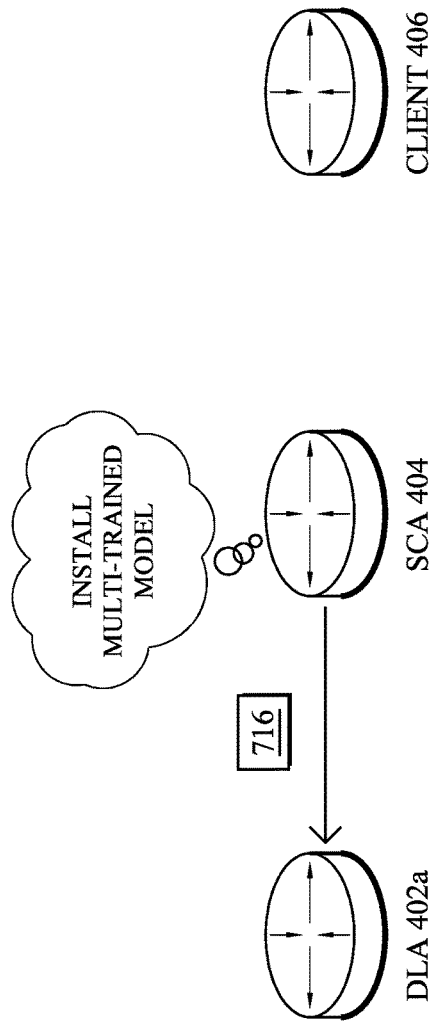
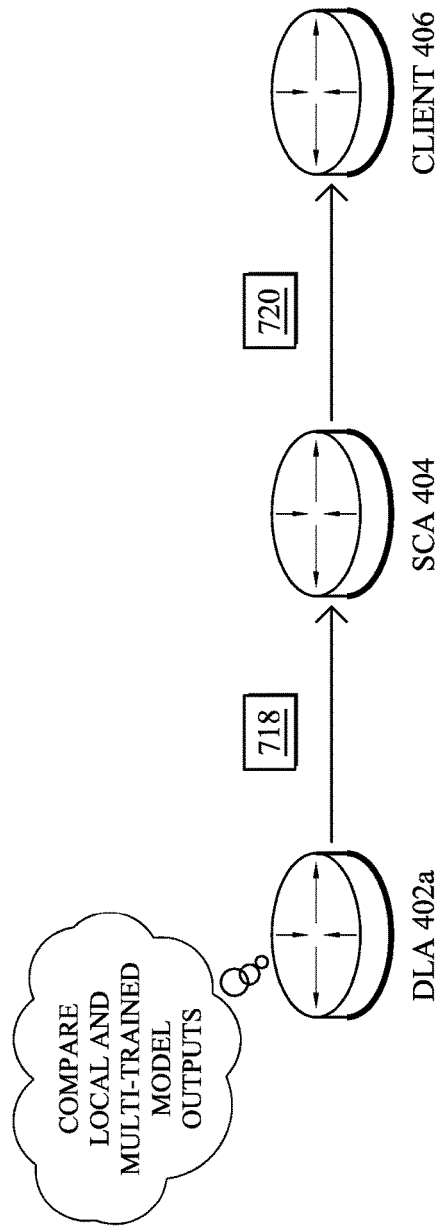

NETWORK-CENTRIC VISUALIZATION OF NORMAL AND ANOMALOUS TRAFFIC PATTERNS

RELATED APPLICATIONS

This application claims priority to U.S. Provisional Application No. 62/167,610, filed May 28, 2015, entitled "NETWORK-CENTRIC VISUALIZATION OF NORMAL AND ANOMALOUS TRAFFIC PATTERNS," by Flacher et al., the contents of which are hereby incorporated by reference.

TECHNICAL FIELD

The present disclosure relates generally to computer networks, and, more particularly, to a network-centric visualization of normal and anomalous traffic patterns.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate examples of model outputs being compared;

DESCRIPTION OF EXAMPLE EMBODIMENTS

Overview

Figure 1A:
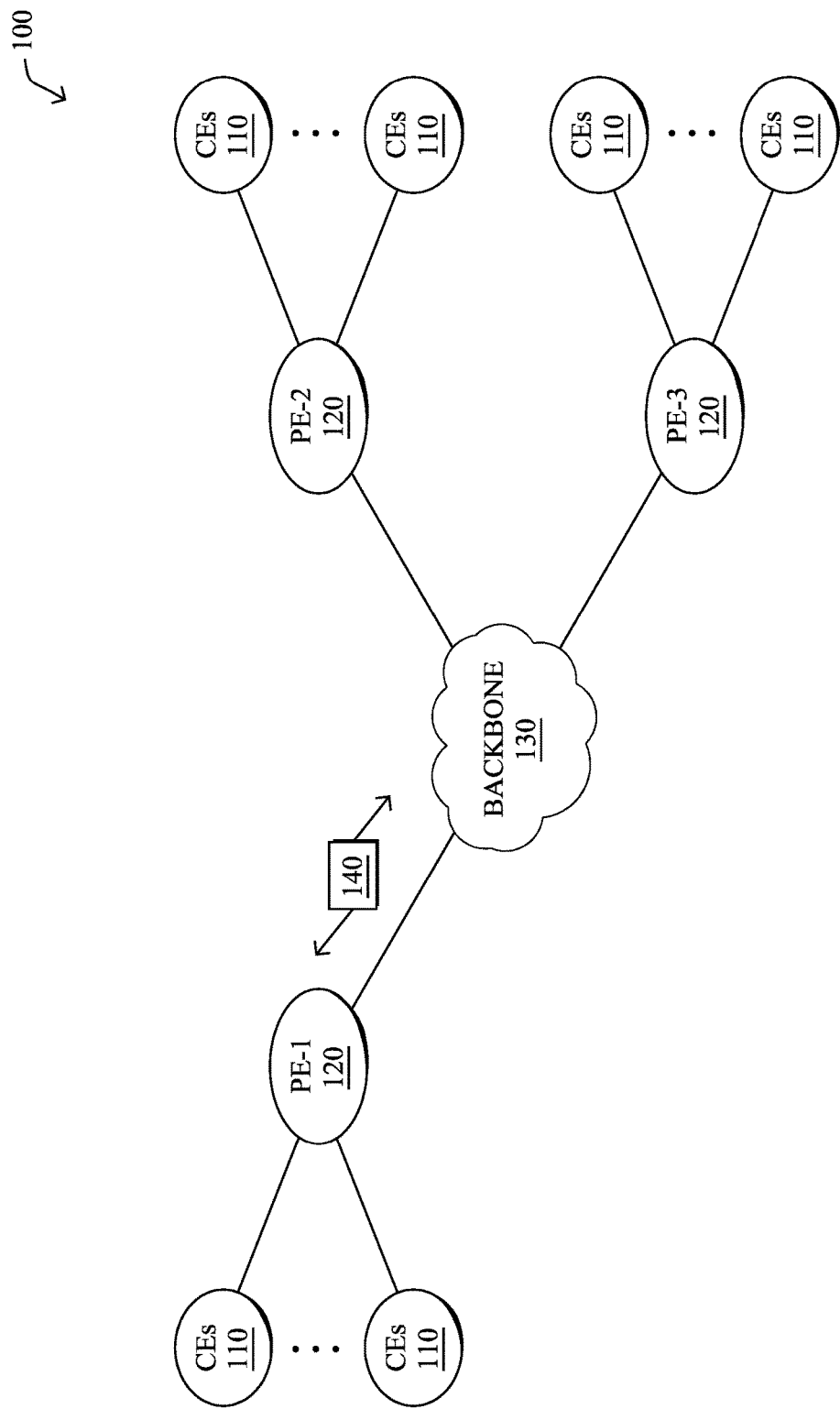
FIGS. 1A-1B illustrate an example communication network.

According to one or more embodiments of the disclosure, a device in a network analyzes local network data regarding a portion of the network that is local to the device using a first anomaly detection model. The device analyzes the local network data using a second anomaly detection model that was trained in part using remote network data regarding a portion of the network that is remote to the device. The device compares outputs of the first and second anomaly detection models. The device identifies the local network data as peculiar, in response to the first anomaly detection model determining the local network data to be normal and the second anomaly detection model determining the local network data to be anomalous.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular site may include a first CE router 110 connected to PE-2 and a second CE router 110 connected to PE-3.

Figure 1B:
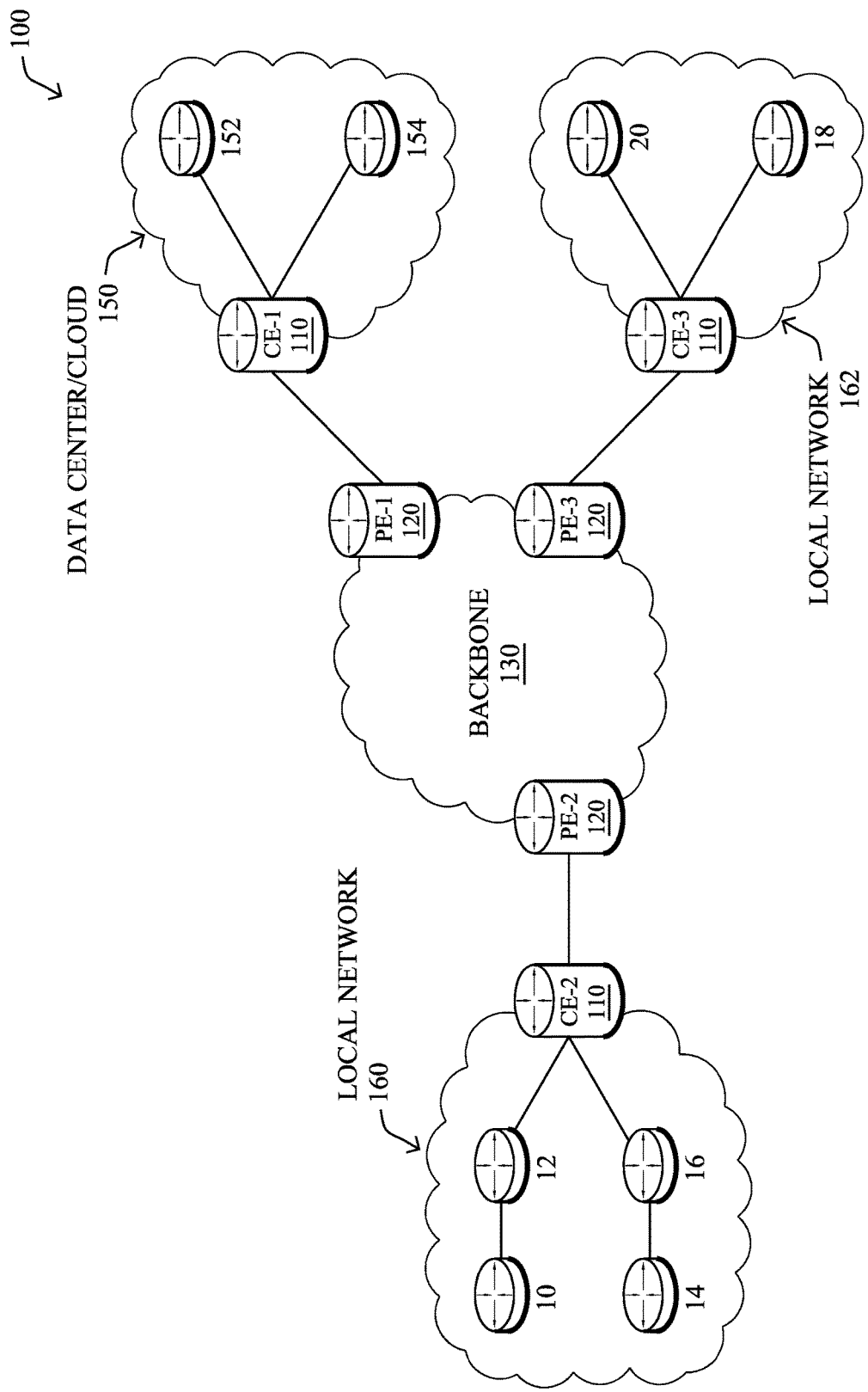

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
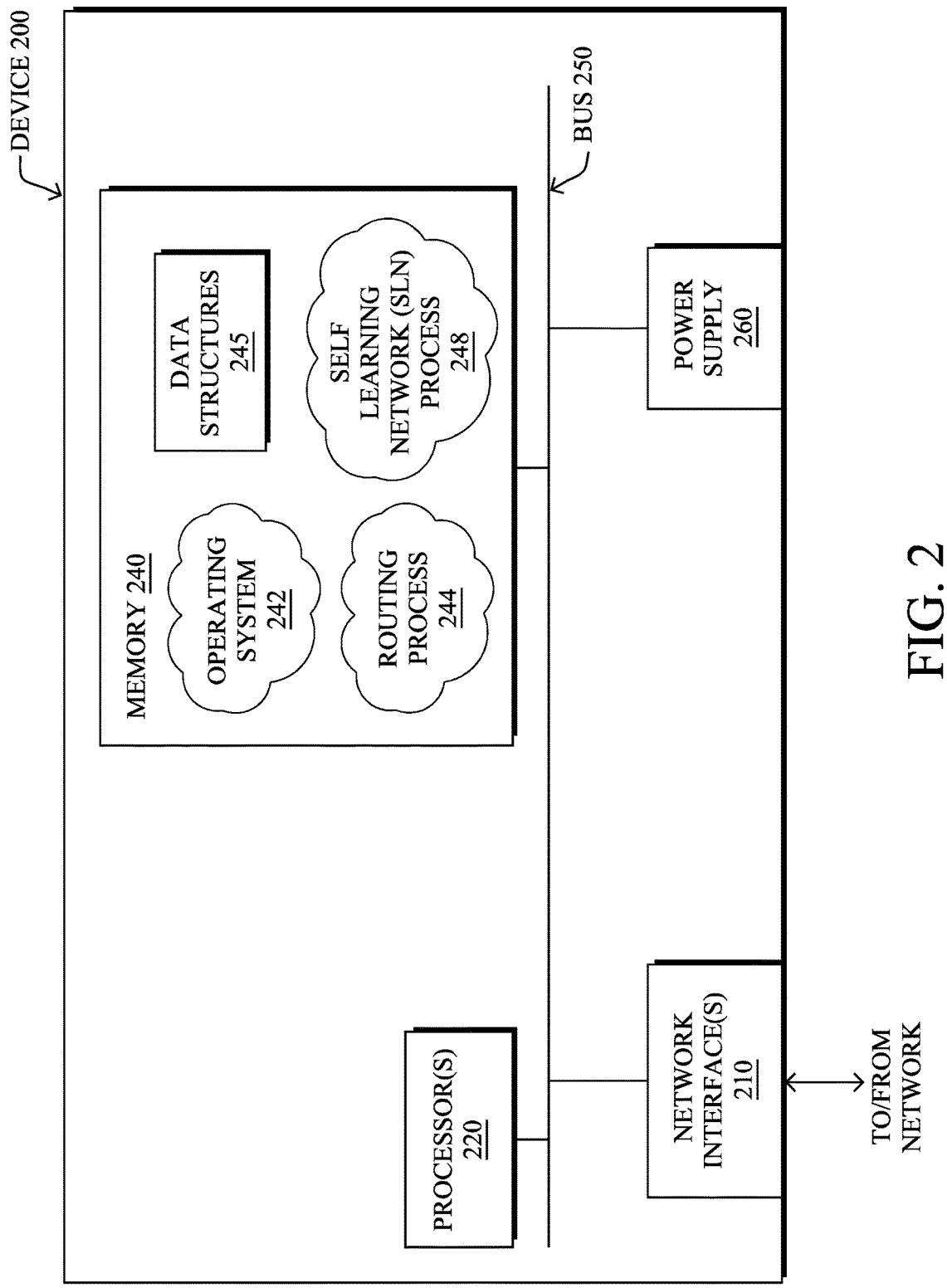
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning processes(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering techniques are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
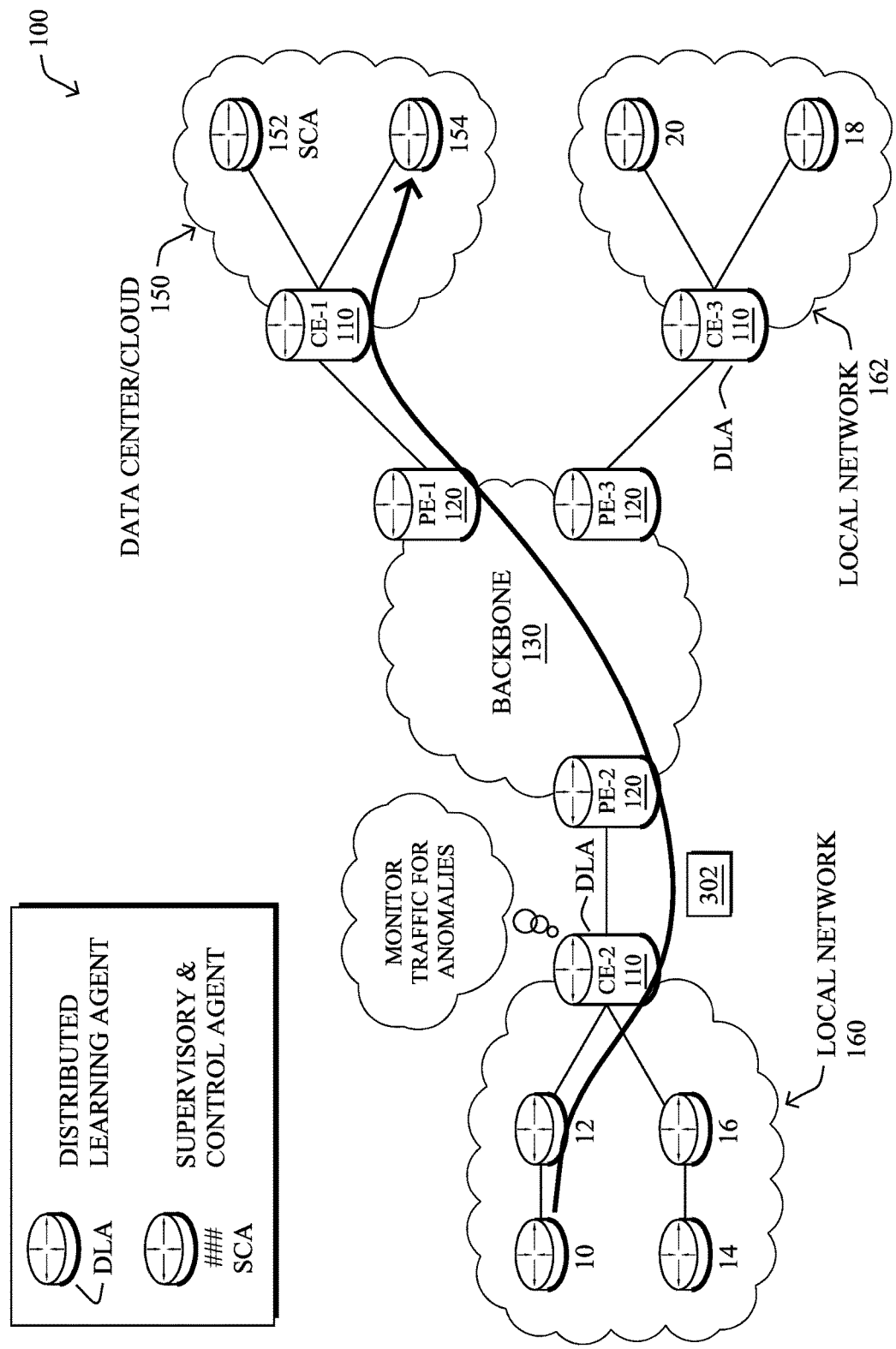
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens).

Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, the anomaly detection component of an SLN architecture may include a number of unsupervised machine learning processes. This class of systems is able to build a model of the "normal" traffic dynamics automatically. Using this model, the systems can then flag statistically significant deviations from the modeled behavior as anomalous. One of the drawbacks of such an approach is that an unsupervised behavioral model is typically of high dimensionality, making its structures too complex and abstract for human understanding. these "black box" models can, for instance, interlace several levels of multi-dimensional functions making a posteriori analysis of the models quite difficult, if not impossible, by a network administrator.

As one goal of an anomaly detection system is to enhance the detection capabilities of human operators in a Security Operation Center (SOC), the ability to provide an understandable model to a human operator of what is considered normal behavior by the system is critical for at least two reasons:

1.) It allows a human operator to validate that the system is working properly, based on his or her expertise and prior knowledge of the network dynamics.
2.) It can provide very useful information to the human operators, by putting in context the detected anomalies and allowing them to perform further analysis and diagnostic. For instance, knowledge that the system was not able to model a minor misconfiguration with a specific pattern properly can speed up the classification of the corresponding behavior as an irrelevant event.

Of course, depending on the type of unsupervised machine learning process used by the system, one can always try to extract a very specific, but more intelligible model from what has been learned. However, it is far more challenging to generate a model of normal behavior that is generic enough to be applied to a broad class of unsupervised machine learning processes used to model these behaviors.

Network-Centric Visualization of Normal and Anomalous Traffic Patterns

The techniques herein allow a user of an SLN system to visualize the models of network traffic, as learned by the anomaly detection modules. These representations of the normal behavior may be built and visualized through the use of network-centric metrics, typically manipulated by security operation center users without any dependencies to the specific choice and implementation of the corresponding machine learning processes. In another aspect, functionality is disclosed that pinpoints to the user the specificities of a network or of subpart of the same network. These specificities are generally defined as unusual but acceptable network traffic behaviors. In some cases, they may be identified by exploiting the distributed aspect of the SLN architecture and realize a competitive decision system mixing several instances of the same anomaly detection modules trained on different devices or dataset.

Specifically, according to one or more embodiments of the disclosure as described in detail below, a device in a network analyzes local network data regarding a portion of the network that is local to the device using a first anomaly detection model. The device analyzes the local network data using a second anomaly detection model that was trained in part using remote network data regarding a portion of the network that is remote to the device. The device compares outputs of the first and second anomaly detection models. The device identifies the local network data as peculiar, in response to the first anomaly detection model determining the local network data to be normal and the second anomaly detection model determining the local network data to be anomalous.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 4:
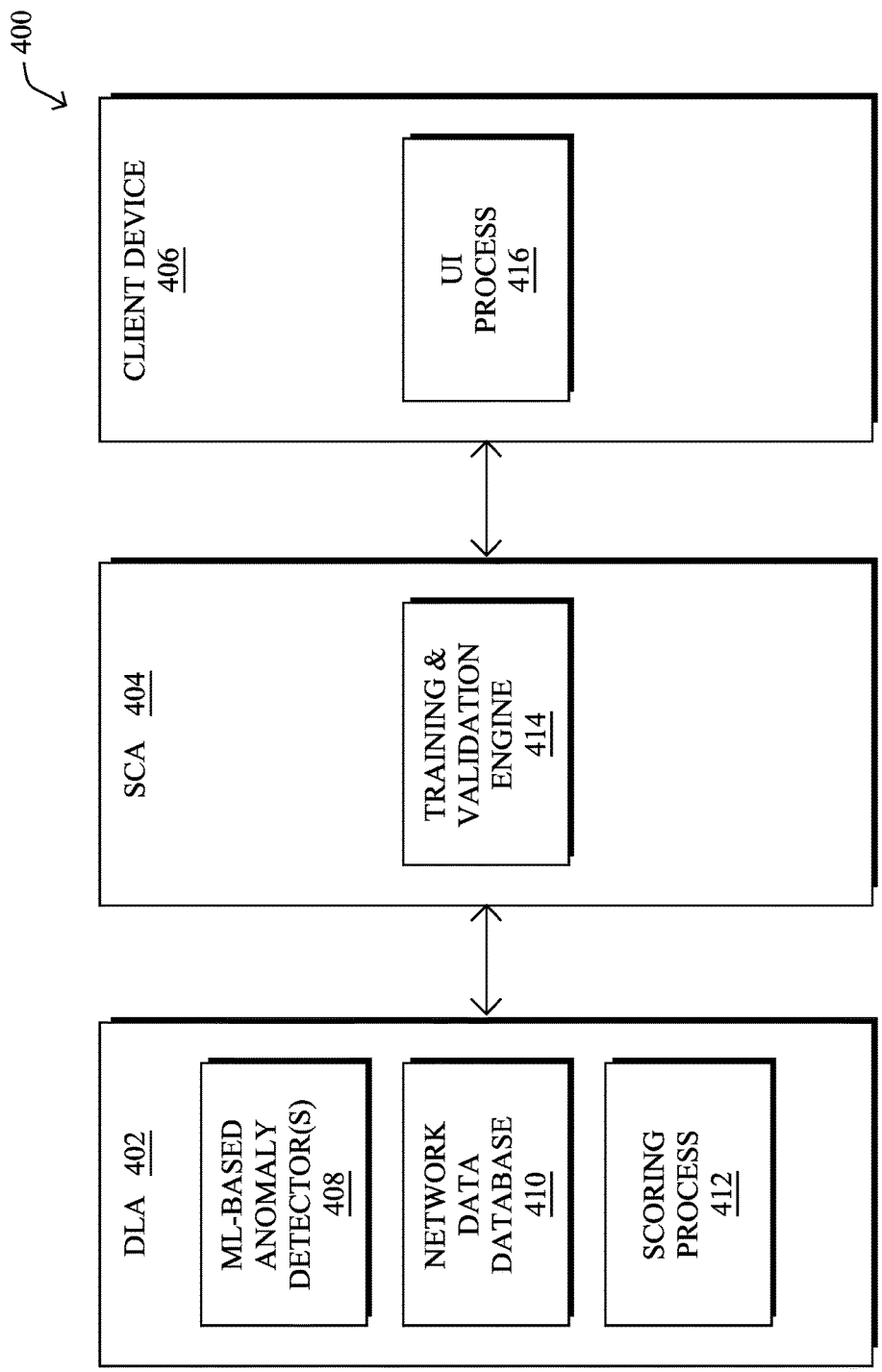
FIG. 4 illustrates an example architecture network-centric visualization of normal and anomalous traffic patterns.

Operationally, an architecture 400 is illustrated in FIG. 4 for providing a network-centric visualization of normal and anomalous traffic patterns, according to various embodiments. As shown, and as described above, an SLN implementation may include one or more DLAs 402, at least one SCA 404, and potentially one or more client devices 406 that interface with SCA 404. The devices 402-406 may execute modules/processes 408-416 as part of an SLN process (e.g., SLN process 248). As would be appreciated, processes 408-416 may be standalone applications, implemented as part of a single application, or combined in any other manner. In addition, the functionality described herein with respect to any of processes 408-416 may be optional in certain implementations.

Client device 406 may be any form of client device such as a desktop computer, laptop computer, mobile device, wearable device, etc. that executes a user interface (UI) process 416. In various embodiments, UI process 416 may communicate with SCA 404 to provide the user of client device 406 with information regarding the anomaly detecting SLN deployed in the network (e.g., via a display, etc.). Additionally, UI process 416 may be configured to allow the user to provide supervisory control over the SLN by sending control parameters and/or instructions from client device 406 to SCA 404. For example, the user of client device 406 may request additional information from the SLN regarding a particular portion of the network, traffic flow, etc. As would be appreciated, UI process 416 may be a stand-alone application or may alternatively be implemented as a web-based interface such as an interface based on the Representational State Transfer (REST) protocol or the like. In further embodiments, SCA 404 may execute UI process 416, allowing the user to interface with SCA 404 directly.

As show, DLA 402 may execute one or more ML-based anomaly detectors 408. Generally, anomaly detector 408 may analyze information regarding the state of the network and, based on the analysis, label the information as either normal or indicative of a network anomaly. Such information may include, but is not limited to, traffic information (e.g., the applications associated with the traffic, the volume of traffic, the source and/or destination of the traffic, etc.), device information (e.g., memory consumption, processor consumption, etc.), or the like.

In various embodiments, the ML-based anomaly detectors 408 may be unsupervised machine learning processes such as ANNs, clustering processes, or the like. In other words, detector(s) 408 may detect anomalous behavior based on the deviation of observed network behavior from a trained behavioral model. This differs from supervised approaches that associate a particular pattern with a classification/label (e.g., if pattern Q is observed, a DoS attack is detected).

DLA 402 may also maintain a network data database 410 of network data observed by DLA 402 or otherwise analyzed by DLA 402 using anomaly detector(s) 408. For example, DLA 402 may store information regarding the various traffic flows analyzed by detector(s) 408 such as the source/destination addresses, the source/destination ports, the protocol used, and/or the application identifiers for the traffic flows. In various embodiments, database 410 may also store network metrics and detection scores associated with the various traffic flows, as generated by scoring process 412. Generally, these scores may quantify the contribution of a particular network metric to the output of a detector 408, as described in greater detail below.

SCA 404 may execute a training and validation engine 414 configured to supervise the training and deployment of anomaly detector(s) 408 to the various DLAs 404 in the network. Engine 414 may also interface with UI process 416, to allow a user of client device 406 to control the training and deployment of detectors 408. In various embodiments, engine 414 may also provide visualization information to UI process 416 regarding the operation of the SLN. For example, engine 414 may receive information from DLA 402 (e.g., as stored in database 410) and provide the information for display to the user of client device 406 via UI process 416. Such visualizations may indicate, e.g., whether an anomaly detector 408 deemed a particular set of network data as anomalous when compared to its model of "normal" network behavior.

Figure 5:
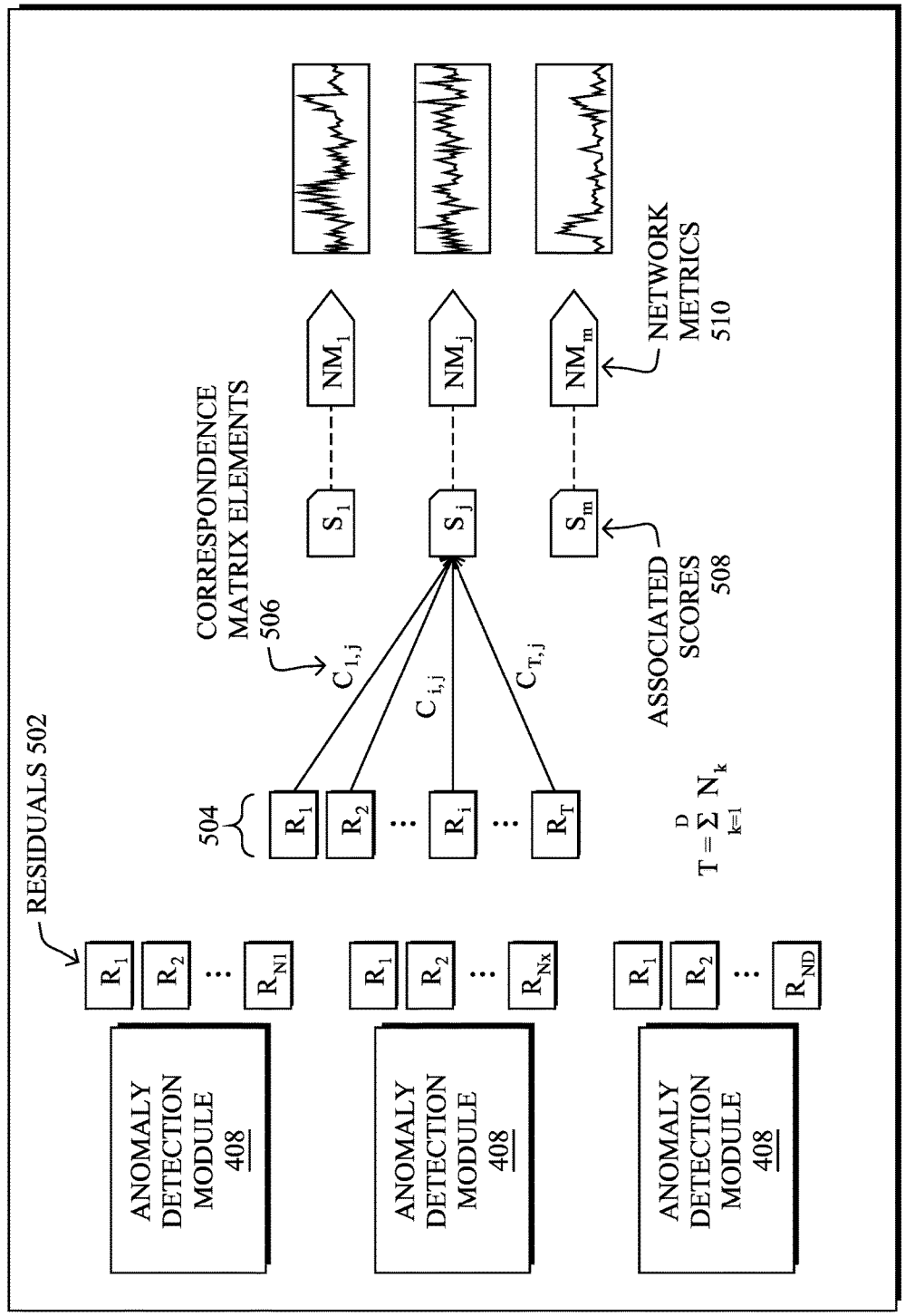
FIG. 5 illustrates an example of network metrics being scored.

Referring now to FIG. 5, an example is shown of network metrics being scored, according to various embodiments. In some embodiments, each DLA may maintain a database or other storage mechanism for storing the network data (e.g., network data database 410), to allow retrieval of the data on demand. In one embodiment, database 410 may store the network data that will be used to build the network metrics requested by the users (e.g., via UI process 416). To be able to reconstruct a model of what is considered as a normal traffic by the anomaly detector(s) 408, scoring process 412 may be in charge of three functionalities:

Model the contribution of the output vectors (e.g., residuals 502) of each anomaly detector 408 to networks metrics 510. These contribution links are described through the definition of a correspondence matrix C which contains as many lines as the total number of anomaly detection outputs and as many columns as the total number of network metrics that the users can investigate at the SCA level. So, for instance, assume that there are D anomaly detection modules producing respectively $n_D$ outputs and there are m network metrics. In such a case, then the correspondence matrix will contain $\Sigma_D n_D \times m$ elements. Each $C_{i,j}$ element (denoted 506 in FIG. 5) is a real number representing the contribution of the $i^{th}$ output 504 in the $j^{th}$ considered network metrics 510. These elements could be equals to 1 (respectively equal to 0), to only take into account that the specific output is linked (or, respectively, not linked) to the determination of correspondence to the network metric. It could be real values in [0,1] to represent the belief of the designer (or also the occurrence-based probability measured offline) of the contribution of this output in the corresponding network metrics. The global anomaly score $S_j$ (denoted 508 in FIG. 5) associated to the specific $j^{th}$ network metric 510 is then computed as the resulting function $S_j = f(C_{i,j})$ for all i in [1, $n_D$]. The computation can be configured by a file describing this matrix and by the set of the function applied for each network metric (one for each column of the matrix, if needed). A very simple implementation could be a linear transformation, considering each global score as a linear combination of the outputs of the anomaly detection modules: $S_j = \Sigma_i C_{i,j} R_i$ where $R_i$ is the $i^{th}$ residual within the whole set of anomaly detection module outputs. Note that non-linear function may also be used.

Store these scores, the corresponding metrics, and their relative context. In various embodiments, the DLA may augment the scores computed by scoring process 412 with a context that denotes the type of traffic for which a score is relevant. For example, such a context may be represented as a 6-tuple (src_ip, dst_ip, src_port, dst_port, ip_protocol, app_id), which denotes a particular type of traffic. The DLA may then store this information in database 410 as a record (e.g., context, metrics, scores).

Build and send the network metrics and the associated global score. As detailed below, the DLA may also query database 410 for a context requested by SCA 406. In some embodiments, to reduce the bandwidth between the DLA and the SCA, only high-level statistics of the scores and network characteristics may be reported. For instance, even if thousands of records match the requested context in database 410, only the mean and standard deviation of the network metrics and scores may be returned.

According to various embodiments, mechanisms are also introduced herein to allow the edge database 410 to scale. Indeed, since the scores will be stored at the edge of the network (e.g., on a particular DLA), the system should be able to adapt to the constraints of the device. Thus, such a scaling mechanism may take into account the storage capabilities of the DLA device, to build a multi-scale scoring of each of the network metrics. In one embodiment, this may be done thanks to an adaptive sliding time windows. For example, each global score $S_j$ may be stored with a predefined sample rate (e.g., 10 Hz, etc.) for a specific time frame $T_F$. As soon the $T_F$ bin is full, the corresponding bin will be resampled by a factor n and store in a previous bin. This process will be repeated n-number of times, in order to fit with the data storage constraints of the device. For instance, an example of such bins is shown below in Table 1.

TABLE 1

| Period | 100 ms | 1 s | 10 s | 1 mn | 10 mn | 1 h | 6 h | 1 d | ... |
|---|---|---|---|---|---|---|---|---|---|
| Size | 1 s | 10 s | 1 mn | 10 mn | 1 h | 6 h | 1 d | 1 w | ... |
| Values (mean + std. dev.) | 10 | 10 | 6 | 10 | 6 | 6 | 4 | 7 | ... |

As shown in Table 1, there are 36 couples (mean, standard deviation) for the network metric, and 36 couples (mean, standard deviation) for the score, so a small set of 144 values (which can be compressed) may be used to represent the last 10 minutes of network data and the corresponding modeling.

In another embodiment, contexts can be iteratively clustered using a distance-based clustering process that use as distance metrics the similarity of metrics and scores vector. By doing so, the accuracy of future queries will gracefully degrade in order to accommodate the storage limitations at the device.

Figure 6:
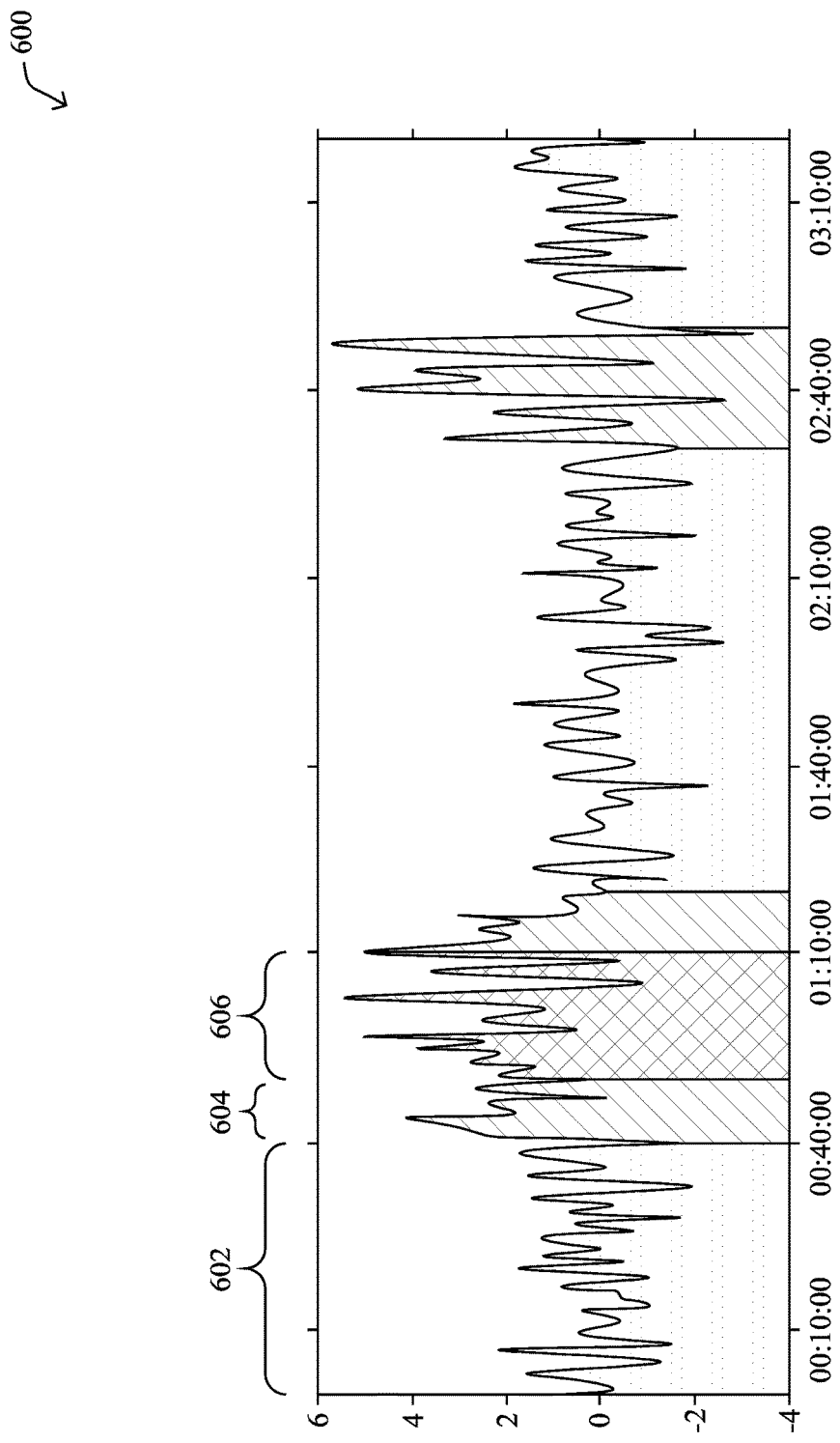
FIG. 6 illustrates an example of a particular network-centric metric over time.

Referring now to FIG. 6, an example is illustrated of a particular network-centric metric 600 over time, according to various embodiments. Based on the scores calculated for metric 600, metric 600 can be "colored" (e.g., categorized) to signify whether an anomaly detector 408 considered metric 600 normal, suspicious, or anomalous, during any given time period. For example, as shown, during time period 602, metric 600 may be deemed "normal." However, during time period 604, metric 600 may be deemed suspicious, as the behavior of metric 600 changes. Then, during time period 606, metric 600 may be deemed anomalous, thereby causing the anomaly detector to detect the presence of an anomaly in the network. In various embodiments, such a visualization, as illustrated in FIG. 6, may be presented by the system to a network administrator (e.g., via UI process 416) on either a pull or push basis.

Figure 7A:
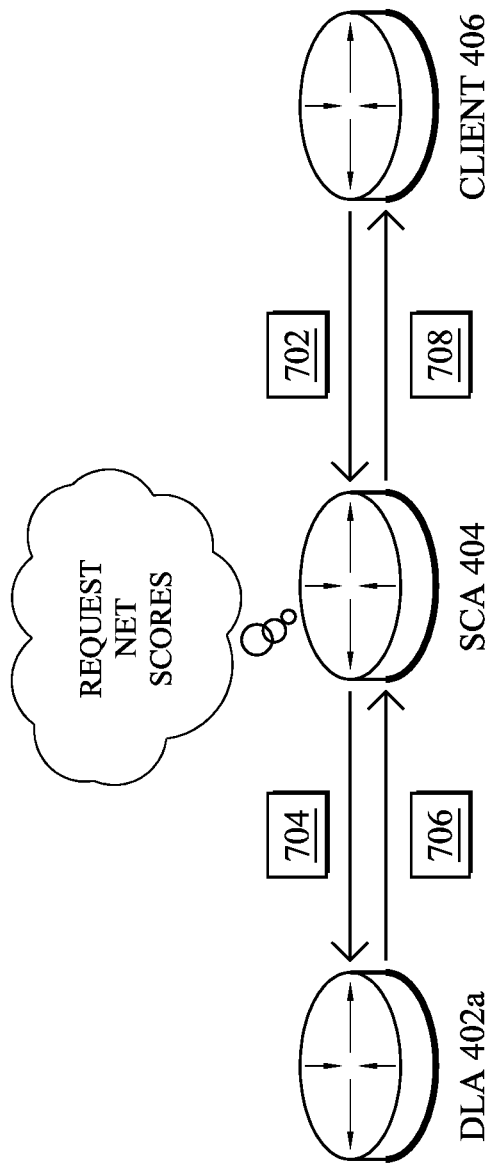

Referring now to FIGS. 7A-7D, examples are illustrated of model outputs being compared, according to various embodiments. As shown in FIG. 7A, a set of network metrics and their corresponding scores, as evaluated by an unsupervised anomaly detector of a DLA, may be visualized. For example, UI process 416 of client device 406 may send a request 702 to SCA 404 for a particular set of network metrics and scores (e.g., for a particular traffic flow, etc.). In turn, SCA 404 may request the corresponding information from a particular DLA 402a and return the information to client device 406 as visualization data 708 for display. In another embodiment, SCA 404 may push visualization data 708 to client device 406 without first receiving request 702.

In various embodiments, SCA 404 may send a message 704 to DLA 402a to request a network score. In some embodiments, message 704 may be a custom unicast IPv4 or IPv6 message called Ask_Net_Scores ( ) that is sent by SCA 404 to DLA 402a, to collect a set of network metrics and their corresponding scores as evaluated by the unsupervised anomaly detector 408 of DLA 402a. As noted previously, network metrics may be specific, network-centric measures built from the network traffic, which are representative of the dynamics of the underlying network. In addition, scores (also called residuals in machine learning) may be built by the anomaly detector as the mathematical difference between the predicted traffic dynamics (computed by models) and the actual observed dynamics. By design, these scores may be computed at the edge of the network (e.g., by scoring process 412 on the DLAs), and computed based on specific features derived from the network characteristics (not necessarily similar to the networks metrics).

The Ask_Net_Scores( ) message 704 may be sent each time a user is investigating the current "normal" traffic model for a specific host, application, IP protocol, or a combination thereof. In various embodiments, message 704 may include any or all of the following: the network metric name requested by the user, a time window of relevance, and/or a context that restricts the scope of the query to a given host, a subnet, an application, some protocol, or the like. In one embodiment, message 704 is sent by SCA 404 to DLA 402a, to retrieve the model of interest when required. In another embodiment, SCA 404 may be asked to send model updates upon the expiration of a timer (period) or when the model has substantially changed.

In response to receiving message 704, DLA 402a may query its local database 410 (e.g., for a particular traffic flow) and return the requested information to SCA 404 via a message 706. Based on the associated scores, SCA 404 may be able to present the requested metrics with a "flavor" of what the current anomaly detection modules are modeling. For a specific sample, if the associated score is close to 0, then it means that the corresponding observed traffic is very close to what the anomaly detection modules were predicting for this sample. Thus, this is a very good sample of what is considered as "normal" by the SLN system. On the contrary, if the score is high, then this means that the corresponding observed traffic did not behave as expected and was considered anomalous by the SLN system. In one embodiment, as illustrated in FIG. 6, the requested network metric may be sent for display as part of visualization data 708 with indicia (e.g., colors, etc.) that depict the normal vs. anomalous aspect of the metric through time according the anomy detection modules. For example, different indicia may be used to indicate when the metric was flagged as suspicious or anomalous by an anomaly detector.

In some cases, network traffic or other network data may be considered "normal" by an anomaly detector, but is otherwise particular and specific to the considered local network. Indeed, within the very large variety of existing network setups or subnet setups in the same global network, there are some invariants that may be observed on each sub-system with subtle variations (e.g., there are very often DNS server or printers servers with peculiar but still acceptable behaviors). By deploying the SLN system on several subnets or networks, different models learned by each instance of the installed anomaly detection modules may be used. Then, by comparing the results (e.g., residuals) of different instance of the same anomaly detection modules on the same network traffic, what is "normal" in the traffic can be identified, while still being quite unusual compared to the other subnets or even the other networks in general. This identification may be useful to pinpoint the specificity of the currently monitored network and to facilitate the appropriation of the SLN architecture by the user, as well as its further exploitation.

In various embodiments, there may be one or more anomaly detector instances on a given DLA: 1.) the "classic" instance already present on the DLA (e.g., a detector having a model trained using local network data from the area of the network in which the DLA is located) and 2.) a Multiple Trained Learning Agent (MTLA) instance. If the anomaly detectors are unsupervised machine learning processes, training the MTLA instances may entail providing these modules with several sets of network data without any prior knowledge or any expected anomaly detections. Thus, these anomaly detection modules will model common minimal baseline representing a shared view of "normal" behaviors. As would be appreciated, the purpose here is not to detect an anomaly, but merely to provide the unsupervised machine learning process with a wide range of network dynamics so that it can really capture a model of the basic general behavior of the networking systems. By construction, this learned model may be smaller than the classic DLA model (e.g., it may predict well very few patterns).

SCA 404 may obtain an MTLA in a number of different ways. In one embodiment, SCA 404 or another device may train an MTLA using offline network records. For example, SCA 404 may train an MTLA using trace data from different portions of the global network. In another embodiment, SCA 404 may use an existing, local anomaly detector from one or more other DLAs as an MTLA for a particular DLA.

Figure 7B:
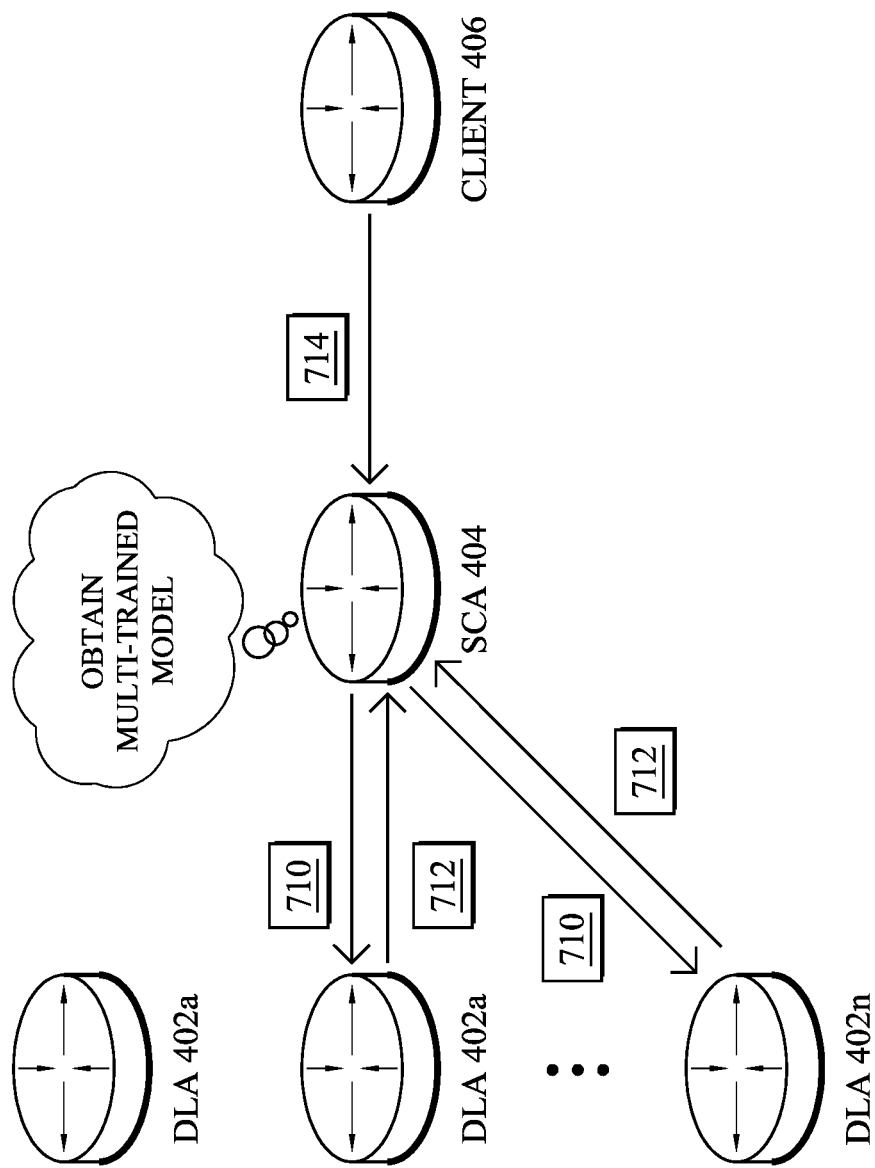

In one example, as shown in FIG. 7B, assume that SCA 404 receives a message 714 from client device 406 that requests the installation of an MTLA onto DLA 402a. In such a case, SCA 404 may send a detector request 710 to one or more other DLAs (e.g., DLA 402b, etc.). In various cases, request 710 may be a custom IPv4 or IPv6 multicast Get_MTLA( )message sent to all DLAs, to collect current model of the anomaly detection model thanks to their "warm start" property. In response, the requested DLA may provide its local anomaly detection model to SCA 404 via messages 712. For example, messages 712 may include the compressed binaries that represent the compressed behavioral models used by the DLAs.

As shown in FIG. 7C, once SCA 404 has obtained an MTLA, either by training the model using offline data from other portions of the network or requesting a model used in another portion of the network, SCA 404 may provide the MTLA to the DLA under analysis. For example, SCA 404 may send an instruction message 716 to DLA 402a that includes the MTLA and potentially other parameters regarding when DLA 402a is to use the MTLA, etc. In the case in which SCA 404 obtains the MTLA from one or more other DLAs, SCA 404 may sort the warm start binaries received via messages 712 according to their current level of confidence and the distance between the targeted anomaly detector and the MTLA in terms of subnet consideration (TND). In such a case, instruction message 716 sent to the targeted DLA 402a may be an Update_MTLA( ) message that includes a subset of the best sorted MTLA warm start binaries. However, if the MTLA is generated offline (e.g., using different sets of network data), the MTLA will be already deployed on each DLA, and the SCA may only send a Run_MTLA( ) message forcing the DLA to create a new instance of the detection module based on the received warm start binaries outputs to the SCA.

As shown in FIG. 7D, DLA 402a may compare the results of its local anomaly detector to that of the deployed MTLA, to identify any peculiar, yet normal behavior observed by DLA 402a. Notably, DLA 402a may analyze the exact same network data using both its own anomaly detector and the MTLA, to determine when there are differences in the outputs. As soon as the MTLA detect an anomaly in the data sample that the local detector considers normal, DLA 402a may identify the network characteristic as "normal but peculiar." In turn, DLA 402a may notify SCA 404 of any such detections via a Normal_ButPec( ) message 718 containing the corresponding network data sample. SCA 404 may further indicate the peculiarity of the sample via visualization data 720 provided for display to client device 406. In some embodiments, SCA 404 may instruct DLA 402a to stop analyzing its local network data using the MTLA such as by sending a Stop_MTLA( ) message to DLA 402, to let the standard anomaly detector instance run alone on the targeted device.

Figure 8:
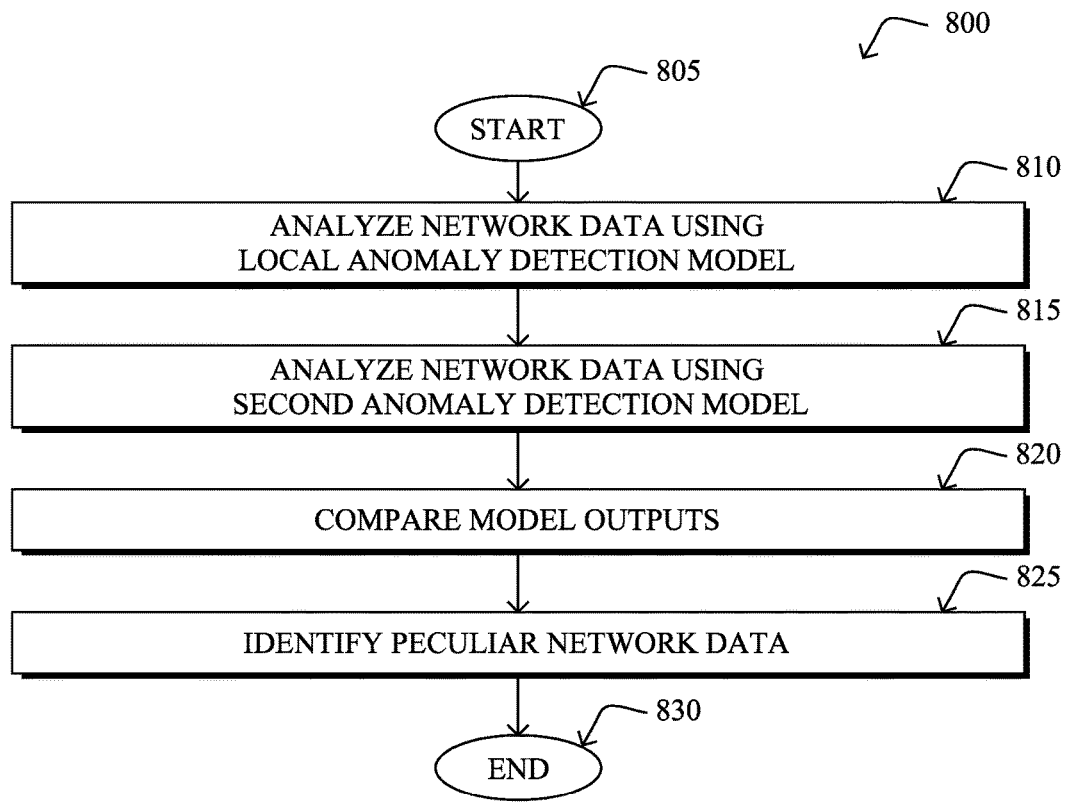
FIG. 8 illustrates an example simplified procedure for identifying peculiar but normal network data.

Referring now to FIG. 8, an example simplified procedure is shown for identifying peculiar but normal network data, according to various embodiments. Procedure 800 may be performed by a device in a network (e.g., device 200) by executing stored instructions. As shown, procedure 800 begins at step 805 and continues on to step 810 where, as described in greater detail above, the device may analyze network data regarding a portion of the network that is local to the device using a first anomaly detection model. Such a model may be a 'local' model that was previously trained to model the behavior of the particular portion of the network in which the device is located. For example, the model may be an unsupervised, machine learning model that was trained using network traffic information from the location of the device in the network.

At step 815, as detailed above, the device may also analyze the network data from step 810 using a second anomaly detection model. Generally, the second anomaly detection model may be a model that was trained in part using remote network data regarding a portion of the network that is remote to the device. In some embodiments, the second model may be a model used by another device/DLA located in a different portion of the network. For example, the device may receive warm start binaries for the second model from a supervisory device (e.g., an SCA), to install the second model. In another embodiment, the second model may be trained using offline network records from the other, remote portion of the network. For example, if the device is located in portion A of the network, the second model may be trained in part using traffic records from portion B of the network.

At step 820, the device may compare the outputs of the first and second anomaly detection models, as described in greater detail above. In particular, the device may compare the results of the analysis of the same network data by the two detection models, to determine whether any discrepancies exist. Notably, certain behavior that may be normal within the local portion of the network may otherwise be peculiar in the context of other portions of the network or the network as a whole.

At step 825, as detailed above, the device may identify the local network data as being normal but peculiar. In particular, the device may deem the analyzed local network data as being peculiar if the first/local anomaly detection model determines that the network data represents normal behavior, but the second anomaly detection model determines the network data to represent anomalous behavior. Procedure 800 then ends at step 830.

Figure 9:
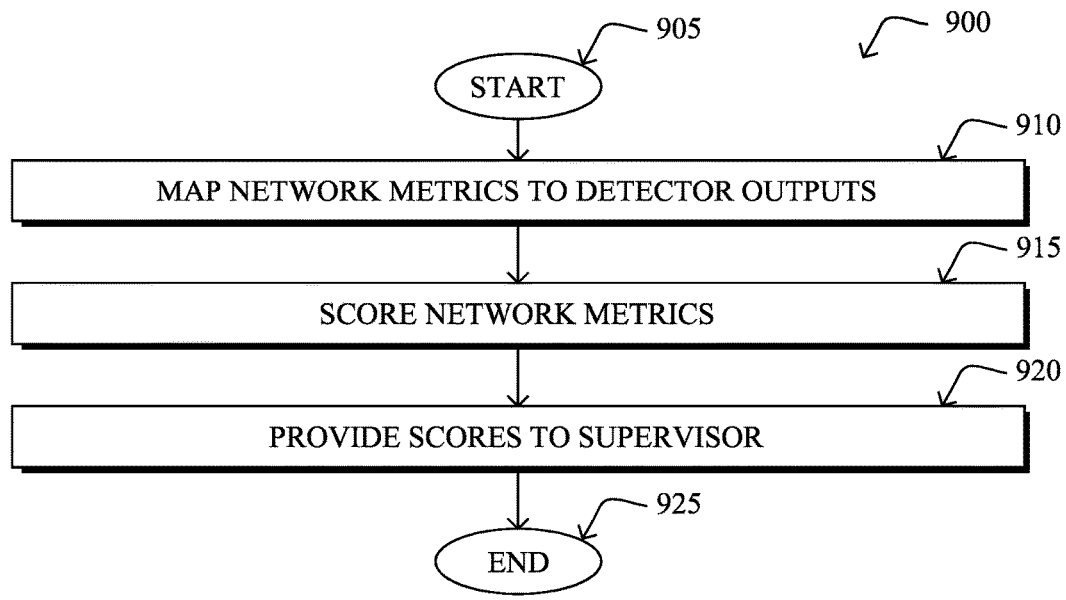
FIG. 9 illustrates an example simplified procedure for scoring network metrics.

Referring now to FIG. 9, an example simplified procedure 900 for scoring network metrics is shown, according to various embodiments. Procedure 900 may begin at step 905 and continues on to step 910 where, as described in greater detail above, a device in a network may map network metrics to the outputs of an anomaly detector. For example, the device may generate a correspondence matrix that maps the outputs (e.g., residuals) of the anomaly detector to that of the network metrics available for view.

At step 915, as detailed above, the device may also score the network metrics according to the contributions of the outputs of the anomaly detector to the metrics. For example, the device may score the relationship between an output and a particular network metrics on a scale from 0-1, with zero representing no contribution and one representing a definite contribution.

At step 920, the device may provide the scores to a supervisory device, as described in greater detail above. For example, if the device receives an Ask_Net_Scores( ) message from an SCA regarding a particular type of network traffic, the device may retrieve the corresponding metrics and scores from a local database and provide this information back to the SCA. Procedure 900 then ends at step 925.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide a generic way to visualize the normal traffic as learned from the automatic detection processes, as well as to visualize the peculiar or specific patterns of the client network. Moreover, the techniques herein respect one of the key features of the SLN architecture, which is to save bandwidth. Notably, all the computations and storage may be performed on the edge and only relevant information pushed toward the SCA.

While there have been shown and described illustrative embodiments that provide for a network-centric view of traffic patterns, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
analyzing, by a device in a network, local network data regarding a portion of the network that is local to the device using a first anomaly detection model;
analyzing, by the device, the local network data using a second anomaly detection model that was trained in part using remote network data regarding a portion of the network that is remote to the device;
comparing, by the device, outputs of the first and second anomaly detection models;
identifying, by the device, the local network data as peculiar, in response to the first anomaly detection model determining the local network data to be normal and the second anomaly detection model determining the local network data to be anomalous;
mapping, by the device, network metrics derived from the local network data to the output of the first anomaly detection model;
scoring, by the device, the network metrics based on the mapping, wherein a score for a particular network metric corresponds to a contribution of the network metric to the output of the first anomaly detection model; and
transmitting, by the device, the network metrics and associated scores for display.

2. The method as in claim 1, further comprising:
receiving, at the device, the second anomaly detection model from a supervisory device in the network.

3. The method as in claim 1, wherein the second anomaly detection model is sent in response to a request from a user interface.

4. The method as in claim 1, further comprising:
providing, by the device, an indication of the local network data having been identified as peculiar for display by a user interface.

5. The method as in claim 1, wherein the second anomaly detection model was trained using offline records that comprise the remote network data.

6. The method as in claim 1, wherein the second anomaly detection model was trained by an anomaly detector deployed to the portion of the network that is remote to the device.

7. The method as in claim 1, wherein the first anomaly detection model is configured to analyze the local network data using unsupervised machine learning.

8. An apparatus, comprising:
one or more network interfaces to communicate with an anchorless network;
a processor coupled to the network interfaces and configured to execute one or more processes; and
a memory configured to store a process executable by the processor, the process when executed configured to:
analyze local network data regarding a portion of the network that is local to the apparatus using a first anomaly detection model;
analyze the local network data using a second anomaly detection model that was trained in part using remote network data regarding a portion of the network that is remote to the apparatus;
compare outputs of the first and second anomaly detection models;
identify the local network data as peculiar, in response to the first anomaly detection model determining the local network data to be normal and the second anomaly detection model determining the local network data to be anomalous;
map network metrics derived from the local network data to the output of the first anomaly detection model;
score the network metrics based on the mapping, wherein a score for a particular network metric corresponds to a contribution of the network metric to the output of the first anomaly detection model; and
transmit the network metrics and associated scores for display.

9. The apparatus as in claim 8, wherein the apparatus receives the second anomaly detection model from a supervisory device in the network.

10. The apparatus as in claim 8, wherein the second anomaly detection model is sent to the apparatus in response to a request from a user interface.

11. The apparatus as in claim 8, wherein the process when executed is further configured to:
provide an indication of the local network data having been identified as peculiar for display by a user interface.

12. The apparatus as in claim 8, wherein the second anomaly detection model was trained using offline records that comprise the remote network data.

13. The apparatus as in claim 8, wherein the second anomaly detection model was trained by an anomaly detector deployed to the portion of the network that is remote to the apparatus.

14. The apparatus as in claim 8, wherein the first anomaly detection model is configured to analyze the local network data using unsupervised machine learning.

15. A tangible, non-transitory, computer-readable media having software encoded thereon, the software when executed by a processor of a device in a network configured to:
analyze local network data regarding a portion of the network that is local to the device using a first anomaly detection model;
analyze the local network data using a second anomaly detection model that was trained in part using remote network data regarding a portion of the network that is remote to the device;
compare outputs of the first and second anomaly detection models;
identify the local network data as peculiar, in response to the first anomaly detection model determining the local network data to be normal and the second anomaly detection model determining the local network data to be anomalous;
map network metrics derived from the local network data to the output of the first anomaly detection model;

score the network metrics based on the mapping, wherein a score for a particular network metric corresponds to a contribution of the network metric to the output of the first anomaly detection model; and transmit the network metrics and associated scores for display.

16. The computer-readable media as in claim 15, wherein the first anomaly detection model is configured to analyze the local network data using unsupervised machine learning.

17. The computer-readable media as in claim 15, wherein the second anomaly detection model was trained by an anomaly detector deployed to the portion of the network that is remote to the apparatus.

18. The computer-readable media as in claim 15, wherein the second anomaly detection model was trained using offline records that comprise the remote network data.

* * * * *